(12) United States Patent
Su et al.

(10) Patent No.: US 7,168,301 B2
(45) Date of Patent: Jan. 30, 2007

(54) METHOD AND APPARATUS OF DRIVING TORSIONAL RESONANCE MODE OF A PROBE-BASED INSTRUMENT

(75) Inventors: Chanmin Su, Ventura, CA (US); Robert C. Daniels, Goleta, CA (US)

(73) Assignee: Veeco Instruments Inc., Woodbury, NY (US)

( * ) Notice: Subject to any disclaimer, the term of this patent is extended or adjusted under 35 U.S.C. 154(b) by 142 days.

(21) Appl. No.: 10/937,597

(22) Filed: Sep. 9, 2004

(65) Prior Publication Data

US 2005/0028583 A1    Feb. 10, 2005

Related U.S. Application Data

(63) Continuation-in-part of application No. 10/189,108, filed on Jul. 2, 2002, now Pat. No. 6,945,099.

(51) Int. Cl.
*G01B 5/28* (2006.01)

(52) U.S. Cl. .................................................. 73/105

(58) Field of Classification Search ................ 73/105, 73/862.59; 250/306, 307
See application file for complete search history.

(56) References Cited

U.S. PATENT DOCUMENTS

| 5,266,801 A | 11/1993 | Elings et al. |
| RE34,489 E | 12/1993 | Hansma et al. |
| 5,267,471 A | 12/1993 | Abraham et al. |
| 5,347,854 A | 9/1994 | Martin et al. |
| 5,386,720 A | 2/1995 | Toda et al. |
| 5,412,980 A | 5/1995 | Elings et al. |
| 5,503,010 A | 4/1996 | Yamanaka |
| 5,646,339 A | 7/1997 | Bayer et al. |
| 6,000,280 A | 12/1999 | Miller et al. |
| 6,006,593 A | 12/1999 | Yamanaka |
| 6,100,524 A | 8/2000 | Yagi et al. |
| 6,552,339 B1 | 4/2003 | Gupta et al. |
| 6,590,208 B2 | 7/2003 | Massie |
| 6,694,817 B2 | 2/2004 | Degertkin et al. |
| 2002/0121131 A1 | 9/2002 | Mancevski et al. |
| 2006/0005614 A1* | 1/2006 | Sahin et al. .................. 73/105 |

FOREIGN PATENT DOCUMENTS

JP    4-321954    * 11/1992

* cited by examiner

*Primary Examiner*—Helen Kwok
(74) *Attorney, Agent, or Firm*—Boyle Fredrickson Newholm Stein & Gratz S.C.

(57) ABSTRACT

A method of operating a scanning probe microscope includes using a probe having a cantilever, and oscillating the probe at a torsional resonance frequency thereof. In addition, the method includes substantially increasing torsional drive efficiency with dual actuators disposed on the probe or the probe base. First and second actuators may be driven by corresponding first and second drive signals, the first and second drive signals being about 180° out of phase. The maximizing step includes altering at least one of the amplitudes of the first and second drive signals to maximize torsional oscillation. Torsional and flexural oscillation of the cantilever probe can be excited concurrently, sequentially or independently by adjusting the phase of the corresponding drive signals. A pair of cantilever components can be used to form a nanotweezer by rotating the respective arms having corresponding tip portions at the distal ends.

41 Claims, 11 Drawing Sheets

METHOD AND APPARATUS OF DRIVING TORSIONAL RESONANCE MODE OF A PROBE-BASED INSTRUMENT

CROSS REFERENCE TO RELATED APPLICATION

This application is a continuation-in-part of U.S. patent application Ser. No. 10/189,108 filed on Jul. 2, 2002, now U.S. Pat. No. 6,945,099 the entirety of which is expressly incorporated by reference herein.

BACKGROUND OF THE INVENTION

1. Field of the Invention

The present invention is directed operating a probe-based instrument in torsional oscillation mode, and more particularly, a method and apparatus of driving the probe into torsional resonance.

2. Description of Related Art

Several probe-based instruments monitor the interaction between a cantilever-based probe and a sample to obtain information concerning one or more characteristics of the sample. Scanning probe microscopes (SPMs), such as the atomic force microscope (AFM), are devices which typically use a sharp tip and low forces to characterize the surface of a sample down to atomic dimensions. More particularly, SPMs typically characterize the surfaces of such small-scale sample features by monitoring the interaction between the sample and the tip of the associated probe assembly. By providing relative scanning movement between the tip and the sample, surface characteristic data and other sample-dependent data can be acquired over a particular region of the sample, and a corresponding map of the sample can be generated. Note that "SPM" and the acronyms for the specific types of SPMs, may be used herein to refer to either the microscope apparatus, or the associated technique, e.g., "scanning probe microscopy."

The atomic force microscope is a very popular type of SPM. The probe of the typical AFM includes a very small cantilever which is fixed to a support at its base and has a sharp probe tip attached to the opposite, free end. The probe tip is brought very near to or into direct or intermittent contact with a surface of the sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as an arrangement of strain gauges, capacitance sensors, etc.

Preferably, the probe is scanned over a surface using a high-resolution three axis scanner acting on the sample support and/or the probe. The instrument is thus capable of creating relative motion between the probe and the sample while measuring the topography or some other property of the sample as described, for example, in Hansma et al. U.S. Pat. No. RE 34,489; Elings et al. U.S. Pat. No. 5,226,801; and Elings et al. U.S. Pat. No. 5,412,980.

AFMs may be designed to operate in a variety of modes, including contact mode and oscillating flexural mode. In contact mode operation, the microscope typically scans the tip across the surface of the sample while keeping the force of the tip on the surface of the sample generally constant by maintaining constant deflection of the cantilever. This effect is accomplished by moving either the sample or the probe assembly vertically to the surface of the sample in response to sensed deflection of the cantilever as the probe is scanned horizontally across the surface. In this way, the data associated with this vertical motion can be stored and then used to construct an image of the sample surface corresponding to the sample characteristic being measured, e.g., surface topography. Alternatively, some AFMs can at least selectively operate in an oscillation "flexural mode" of operation in which the cantilever oscillates generally about a fixed end. One popular flexure mode of operation is the so-called TappingMode™ AFM operation (TappingMode™ is a trademark of the present assignee). In a TappingMode™ AFM, the cantilever probe is oscillated flexurally at or near one of its resonant frequencies. When the tip is in intermittent or proximate contact with surfaces the oscillation amplitude will be determined by tip/surface interactions. The amplitude or phase of this oscillation is kept constant during scanning using feedback signals, which are generated in response to tip-sample interaction. As in contact mode, these feedback signals are then collected, stored, and used as data to characterize the sample.

Independent of their mode of operation, AFMs can obtain resolution down to the atomic level on a wide variety of insulating or conductive surfaces in air, liquid or vacuum by using piezoelectric scanners, optical lever deflection detectors, and very small cantilevers typically fabricated using photolithographic techniques. Because of their resolution and versatility, AFMs are important measurement devices in many diverse fields ranging from semiconductor manufacturing to biological research.

One limiting characteristic of AFMs and other probe-based instruments lies in the above-described modes of operation. In an AFM, the cantilever is typically oscillated using a piezoelectric drive, often known simply as a piezo drive, to provide, for example, a flexural oscillation mode. Referring to FIG. 1, a probe assembly 20 includes a probe 21 having a cantilever 22 and a tip 28. The cantilever 22 extends outwardly from a base 24 of assembly 20. The cantilever 22 may be attached to the base 24 or formed integrally with it. Base 24 is typically coupled to a piezoelectric drive 26 (e.g., a piezo stack). Tip 28 is provided on the opposed, free end of cantilever 22. Piezoelectric drive 26 can be selectively excited by a signal generator 30 to move cantilever 22 up and down relative to a sample 32. When the instrument is configured for flexural oscillation mode operation, the drive voltage is applied to piezoelectric drive 26 to flexurally oscillate the cantilever 22 about a lateral axis of the probe 21 at a frequency that is dependent upon the frequency of the drive voltage.

More particularly, in flexural oscillation mode, cantilever 22 is driven to resonate at its flexural resonance frequency or a harmonic thereof about a lateral axis A–A' at the base 24 of cantilever 22. Characteristics of cantilever flexural oscillation, and changes thereof, are detected by quadrature photodetector 34, typically with its vertical components, as shown by the arrow "V" in FIG. 1. The deflection angle is sensed by photodetector 34 and output as a voltage signal. Notably, the amplitude of the flexural oscillation ranges between a few nm to 100 nm peak-to-peak depending on the cantilever length.

In operation, as tip 28 approaches a surface of sample 32, the flexural oscillation (tapping) amplitude starts to decrease due to contact between tip 28 and sample 32. Notably, the flexural vibration amplitude decreases to zero when tip 28 is pushed against sample 32 with constant contact pressure. Variation of amplitude between zero (generally continuous contact) and free oscillation is typically used in a feedback configuration to control tip/surface distance. Alternatively, the phase of the flexural oscillation may be used to control this distance. Information relating to the surface such as topology, hardness, and/or electromagnetic properties is then determined by analyzing the signals that are used to control this tip/surface spacing.

Overall, flexural oscillation mode AFMs are used to characterize surface topology and surface energy dissipation by monitoring the amplitude and/or phase of the oscillating cantilever. This mode is often preferred to contact mode imaging because it produces less damage to the tip and sample during operation. However, operating the AFM based on flexural oscillation of the cantilever is constrained in the following aspects.

Initially, flexural mode operation only detects surface characteristics that impart a force in one direction, namely, the vertical or "Z" direction. As a result, flexural mode AFMs do not detect shear force interaction, and thus also cannot provide shear force or force gradient information. This information is critical to making measurements of surface friction, for example, when attempting to identify surface compositional differences. When the topography of the materials is generally undifferentiated, minimal information is provided by flexural mode operation, and thus this friction information becomes particularly valuable, and sometimes necessary. Applications include identifying different components in polymer blends, composites and other mixtures, identifying organic and other contaminants on sample surfaces, delineating coverage by deposited coatings and other surface layers, etc.

Moreover, without shear force or shear force gradient measurement capabilities, flexural mode operation often results in loss of other information relating to the sample. For example, when a flexural oscillation mode AFM is used to image the magnetic domain of a sample, only a force gradient in the direction perpendicular to the sample surface can be sensed. Domains parallel to the surface can only be seen at the domain boundaries where the transitional region has a vertical force gradient. This limitation also holds true for electric force imaging.

Other drawbacks associated with flexural resonance imaging are slow kinetics and small amplitude errors that can drastically limit scanning and data acquisition speed and compromise image integrity. This effect is illustrated in the response curve 40 of FIG. 2. In this case, $A_o$ is the free air amplitude of oscillation (in RMS voltage), and $A_s$ is the set-point amplitude for the control loop. When $A_o$ starts to decrease from a constant value, $A_o$, the tip starts to tap on the sample surface. When tip/sample separation is reduced, and the tip and sample interact, there is a corresponding change in the signal produced by the deflection detection system. The amplitude of flexural oscillation of the lever decreases due to it being constrained by the sample surface as the tip approaches the surface and taps the sample in each stroke of the oscillation. This is shown in region "O" in which tip-surface distance (x-axis) is smaller than half of the peak-to-peak oscillation of the cantilever. Notably, a feedback loop operates to move the cantilever up and down to keep generally the same oscillation amplitude $A_s$. This movement reflects height changes in the sample, i.e., surface topology.

The response of the cantilever in this flexural mode is illustrated by the slope of the curve at region "O." In other words, for a particular change in tip/sample separation ($\Delta Z_1$), the corresponding measured change in voltage ($\Delta V_f$) is relatively small given the shallow slope. It is this measured change that determines the error that is processed by the feedback loop to return operation to the set-point oscillation. Because the slope of the cantilever response in flexural mode is relatively shallow, scan speed must be kept small as relatively large changes in tip-sample separation produce a relatively small change in measured output, or error. Therefore, to facilitate adequate data collection and integration of error signals, the scan time at each location (or image pixel) must be long enough for the system to respond with accuracy and resolution. The speed of data acquisition must be correspondingly limited as well. An improvement in data acquisition speed was desired.

Moreover, the shallow slope of the amplitude/distance curve in FIG. 2 makes the control signal (voltage in the vertical axis) correspond to a large height or distance compared to an amplitude/distance curve with a steeper slope. As a result, the control error will correspond to a greater quantity of height measurement error. The situation is particularly problematic when the probe is scanning across an abrupt step where slower response due to error integration will result in even greater inaccuracy for a given scan speed. Notably, such inaccuracy may be detrimental to obtaining useful data in semiconductor metrology. The response of an improved AFM, according to the present preferred embodiments (AFM operating torsional resonance mode), is illustrated in FIG. 2A and will described in further detail below.

Yet another limitation with flexural mode operation is that the flexural resonance is very sensitive to the imaging environment (e.g., when the sample is immersed in water), and thus oscillation properties often change drastically, and in unpredictable ways, upon change in imaging environment. Currently, the sensitivity of flexural mode operation to imaging environment is one of the most significant design considerations when configuring an AFM for operation in fluid.

Other modes of AFM operation are similarly limited. For example, shear force interaction between the probe in contact mode and the corresponding sample surface has been studied with AFM for a number of years. In an AFM technique known as lateral force microscopy (LFM), the cantilever tip is dragged across the sample surface, as in contact mode, to measure friction forces, as described in U.S. Pat. No. 5,553,487 to the present assignee. More particularly, using LFM, the tip is introduced to the sample surface under a constant flexural deflection and then scanned along the surface either in the direction of the cantilever length, or perpendicular to the cantilever length. Using a laser-based deflection detection system, the lateral cells of the corresponding photodetector sense rotation of the cantilever as the tip of the probe interacts with the sample through friction force. In the case where tip scanning direction is perpendicular to the cantilever, the difference of the lateral deflection during forward and reverse scanning of the same portion of the sample is used as a relative measure of the shear force, or surface friction. In addition to the drawbacks associated with using contact mode to detect topology characteristics, including tip/sample damage, etc., LFM suffers the disadvantage of large tip/sample forces associated with contact mode, and poor repeatability.

In other techniques, the tip placed in contact with the sample surface is modulated by moving the sample surface laterally relative to the probe. In this case, the lateral rocking of the cantilever as a result of the contact friction is used to indicate a quantity of surface friction. However, the lateral deflection signals are small, and thus often unusable, and resolution is insufficient for some of the applications contemplated by the present invention.

In addition, although lateral deflection signals induced by motion of the sample at acoustic frequencies can be enhanced, the main control loop that defines tip/surface relative position still employs vertical deflection (contact mode) feedback and, therefore, suffers the drawbacks associated with flexural contact modes.

One challenge in implementing an AFM to image in torsional resonance mode is that optimum performance depends on efficiently driving the cantilever probe into torsional resonance. It is important to note that typical AFM cantilever probes are manufactured for flexural motion, i.e., motion in the "Z" direction. This is primarily due to the fact that the optical system used in detecting mechanical changes in the oscillating motion of a cantilever are aligned in the "Z" direction. Also in this regard, probes designed for flexural motion are easy to produce in batches while preserving their planarity, which is important to ensure accurate measurement of changes in flexural oscillation.

A potential problem arises with standard AFM cantilevers designed for flexural oscillation due to the fact that there is physical asymmetry along the corresponding length of the lever which although acceptable when driving the probe into flexural oscillation, can render driving the cantilever into pure torsional resonance difficult. For instance, if torsional resonance is excited with two piezoelectric actuators driven out of phase, the piezo-actuators must be disposed generally symmetrically about (1) the length of the cantilever, along its central axis, and the (2) corresponding tip to create pure rotational motion of the cantilever about a rotation center, approximately equidistant from the two piezoelectric actuators. The problem is, it is difficult to insure that the central axis of the probe lies at the rotation center of the drive. For instance, mounting the probe (i.e., probe chip) in the AFM head is often an imprecise task due to allowable variations in probe chip position, as well as structural variations of the probe chip and probe itself. In addition, even if the actuators are positioned equidistant from the central axis of the cantilever, due to fabrication limitations, it is difficult to determine whether the drive actuators are positioned symmetrically about the tip which, although preferably resides at the central axis of the lever, often does not.

Notably, in this regard, the tip of the probe attached to the lever is relatively massive (it can be as much as fifteen microns long) such that the inertia of the tip causes a torque. This torque produces an arcing motion at the apex of the tip, but given the scale that this motion occurs, the apex moves substantially horizontally. Overall, however, it is difficult to determine the amount of lateral motion that can be provided by such a system due to inefficiencies coupling the energy to the tip caused by the imperfect spatial relationship between the probe tip and the drive.

As suggested previously, if the probe is well centered between the two piezo actuators (eg., plates) that are employed to drive the probe into torsional resonance, then the system will excite pure lateral motion of the tip. As a practical matter, however, because the tip typically is not centered, due to, for example, imperfections produced during the probe manufacturing process which may cause the tip to be positioned off the central axis of the cantilever or the entire probe to be mounted off-center intermediate the two piezo plates when secured in the AFM head.

Whatever the cause, this compromised relationship between the drive and the probe can produce imperfect lateral motion of the cantilever, and thus the tip. In particular, often times, this motion will exhibit a vertical component. Such non-ideal motion lowers the efficiency of operation in torsional resonance mode. For instance, a vertical component in the cantilever motion can make maintaining operation at the setpoint difficult. Moreover, due to the high "Q" associated with torsional resonance mode, the overture of the flexural vibration of the cantilever is fairly close to the fundamental torsional resonance oscillation frequency of the cantilever. Therefore, the vertical component of cantilever motion may become mixed with torsional oscillation such that the system becomes very unstable, with the possibility that AFM operation toggles between, for instance, torsional resonance and flexural resonance modes of AFM operation. Clearly, this unpredictability is non-ideal. Overall, due to the many potential pitfalls with insuring true alignment between the probe tip and the center of rotation produced by the drive, including imperfect mounting of the probe within the AFM had, an alternative driving arrangement was desired.

Maintaining oscillation generally at the true torsional resonance of the probe is particularly important when considering the range of applications offered by operating the AFM in torsional resonance mode. In an AFM application that is particularly interesting, the probe is used to manipulate, for instance, nanoparticles. Given the scale of operation, one key challenge in using an AFM probe to perform nanomanipulation is determining whether a particular operation associated with manipulating nanoparticles has actually been accomplished. In standard AFM operation, once a target to be manipulated has been identified and an operation attempted by the AFM probe, there is no convenient way to determine whether the target has actually been acted on. For instance, if the operation is to pick up a target, one might think that the change in weight at the tip could be measured. However, because the target to be manipulated typically does not have an appreciably greater weight than the tip, methods based on directly measuring a change in weight are unreliable and, in any event, difficult to implement. In fact, there is such a small change in mass at the tip, e.g., one part in a million of the entire cantilever, directly measuring the change is generally impossible. As such, an alternate technique, preferably one which observes a unique parameter associated with the AFM probe, was therefore desired.

In addition, known techniques for performing nanomanipulation, such as ones that employ what are known as "nanotweezers," have significant limitations. Most such techniques only have the ability to manipulate targets that are on the scale of a micron or even a little larger. This is due to the fact that there are often difficulties associated with locating the tweezers at a location of interest, and controlling the force applied by the tweezers to the sample, for example. In one technique, electrostatic forces are used to actuate two adjacent columns or beams. In this case, a voltage is applied to at least one of the beams to modify the attractive force between the two beams, thus causing the beams to close one against the other. By controlling the voltage, the beams can be used to close on an object to be manipulated. One problem with such a system is that large magnitude forces are required to close the arms, which can compromise the object being manipulated. Moreover, in this regard, the dimensions of candidate target objects to be manipulated are correspondingly limited in that objects that are too small cannot be feasibly manipulated, especially given the higher voltages, and thus the higher forces, that are difficult to accurately control. Development of manipulation applications is continuing on the nanoscale, and thus a superior design was desired. In particular, an improved nanomanipulation device with the ability to close a gap of about fifty to two hundred nanometers in a highly controllable and accurate fashion, would be particularly valuable.

SUMMARY OF THE INVENTION

The preferred embodiments overcome the above-noted drawbacks by aligning the rotational center produced by the torsional resonance mode drive with the tip so that pure torsional motion can be obtained. In the preferred embodiment, the power provided by the two piezos driving the cantilever into torsional resonance is generated by applying signals out of phase with each other and having varying amplitudes so as to distribute power such that the rotational center of the motion directly overlies the apex of the tip. More particularly, by appropriately modifying the amplitudes of the signals applied to the piezo plates, the rotational center of the cantilever can be moved to produce ideal torsional motion and optimum data acquisition capabilities in torsional resonance (TR) mode.

According to a first aspect of the preferred embodiment, a method of operating a scanning probe microscope includes using a probe having a cantilever and oscillating the probe at a torsional resonance frequency thereof. In addition, the method includes substantially maximizing an amplitude of probe oscillation.

In another aspect of this embodiment, the oscillating step includes using first and second actuators disposed relative to the probe so as to generate torsional motion of a tip of the probe. Preferably, the actuators are piezoelectric actuators.

In a still further aspect of this embodiment, the first and second actuators are driven by corresponding first and second drive signals, the first and second drive signals being about 180° out of phase. The maximizing step includes altering at least one of the amplitudes of the first and second drive signals.

According to another aspect of this embodiment, the altering step includes using a balance mode control unit to adjust the amplitudes of the first and second drive signals so that the torsional response at a given drive power is maximized. The balance control unit preferably includes a voltage multiplier and operates automatically to substantially maximize the torsional response amplitude.

According to a further aspect of this preferred embodiment, the probe is an active probe having at least one active element and at least one corresponding electrode integrated with the probe. Ideally, the probe includes first and second electrodes adapted to receive corresponding first and second drive signals.

According to yet anther aspect of this preferred embodiment, the cantilever is split into first and second longitudinal portions and a tip at a distal end of the cantilever is split into first and second tip portions that are actuatable so as to form a nanotweezers.

In accordance with another aspect of this preferred embodiment, a method of operating a scanning probe microscope in torsional resonance mode includes oscillating a tip of a probe with an actuator at a torsional resonance frequency of the probe. Preferably, the oscillating step includes substantially maintaining an axis of rotation provided by the actuator so that it substantially directly overlies an apex of the tip.

According to a further aspect of this preferred embodiment, the maintaining step includes balancing the output of the actuator. The actuator preferably includes first and second actuator elements disposed generally symmetrically about the probe and the balancing step includes applying first and second drive signals to the first and second actuators. The applying step includes selecting the amplitudes of the first and second drive signals having opposite phase automatically.

In yet another aspect of the preferred embodiment, the oscillating step is performed using a shear piezoelectric actuator. Moreover, the vertical and shear actuators are preferably coupled.

According to a still further aspect of the preferred embodiment, a scanning probe microscope includes a probe having a tip, and a drive to oscillate the probe at a torsional resonance of the probe. The drive preferably has an axis of rotation that substantially directly overlies an apex of the tip.

In another aspect of this embodiment, the drive includes a drive source and an actuator including first and second actuator elements. The drive source applies first and second drive signals to the actuator elements.

In a still further aspect of this embodiment, a mode control unit is employed to balance the drive so that the torsional oscillation of the probe is substantially maximized. Preferably, the mode control unit includes a voltage divider.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 14A is a front elevational view of a nanotweezer tip of the probe;

DETAILED DESCRIPTION OF THE PREFERRED EMBODIMENT

A probe-based instrument, such as an AFM, that analyzes one or more characteristics of a sample in a torsional resonance mode is shown in the Figures and described herein. More particularly, a number of techniques for generating a steady torsional resonance in the cantilever of the SPM probe assembly is discussed. TR mode, together with feedback control, is used to image or otherwise characterize sample surfaces.

During operation, a property of a torsional oscillation of the probe (e.g., amplitude or phase of probe oscillation about the longitudinal centerline of the probe's cantilever) is monitored to determine sample surface characteristics. Notably, the torsional signal detection and feedback control is preferably implemented using configurations similar to that used in known AFMs, such as in the AFMs offered by the Veeco Instruments Inc. However, compared to known AFM operating modes, including flexural oscillation mode operation, the potential benefits of the present torsional resonance mode of AFM operation include improved scanning speed, as well as offering the ability to significantly improve small-scale mass detection and nanomanipulation of particles. Moreover, these benefits can be achieved while simultaneously operating the AFM in conventional flexural mode.

Note that when the term "horizontal motion" is used herein, it is intended to refer to the motion that is produced by the torque that rotates the tip so that the apex of the tip moves parallel to the sample surface. However, because the scale of the arc that is traced out by the motion of the tip is relatively small, motion is effectively only in the horizontal direction.

Modes of Operation

Figure 3:
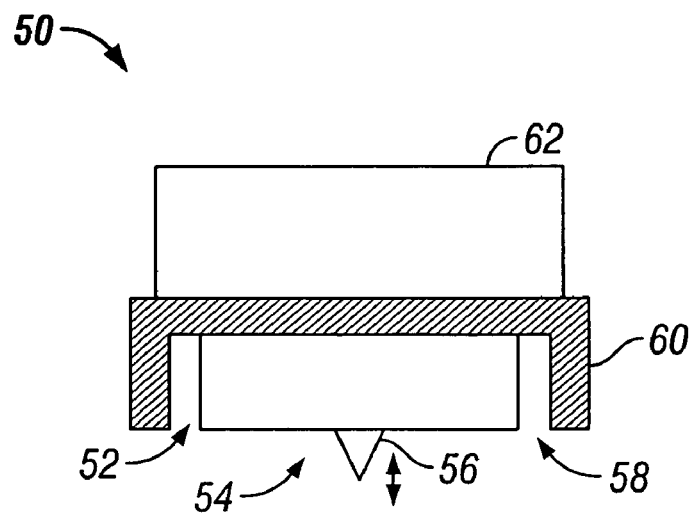
FIG. 3 is a front elevational view of a probe assembly including a piezoelectric actuator and a probe chip mounted in a probe holder.

With reference to FIG. 3, a probe assembly 50 of a conventional atomic force microscope (not shown) includes a probe chip 52 having a probe 54 defining a tip 56. The probe chip 52 is mounted within a probe pocket 58 of a probe holder 60 that supports the probe chip 52. To excite the probe 54 into resonance, an actuator 62 (for example, a piezoelectric actuator such as a piezo stack) is mounted to the probe holder 60 and is used to drive the probe according to the mode of operation. Notably, probe 54 can be driven into flexural oscillation or torsional oscillation.

Piezoelectric actuator 62 is typically a vertical actuator that oscillates the probe 54 into flexural motion. When driven in this fashion, the tip 56 of probe 54 will tap on the surface of the sample under test (not shown) as the flexural motion of the probe 54 is monitored, for example, with a laser detection scheme. By employing a vertical piezoelectric actuator, lateral motion of the probe 54 cannot be achieved and thus torsional resonance cannot be excited.

Figure 4:
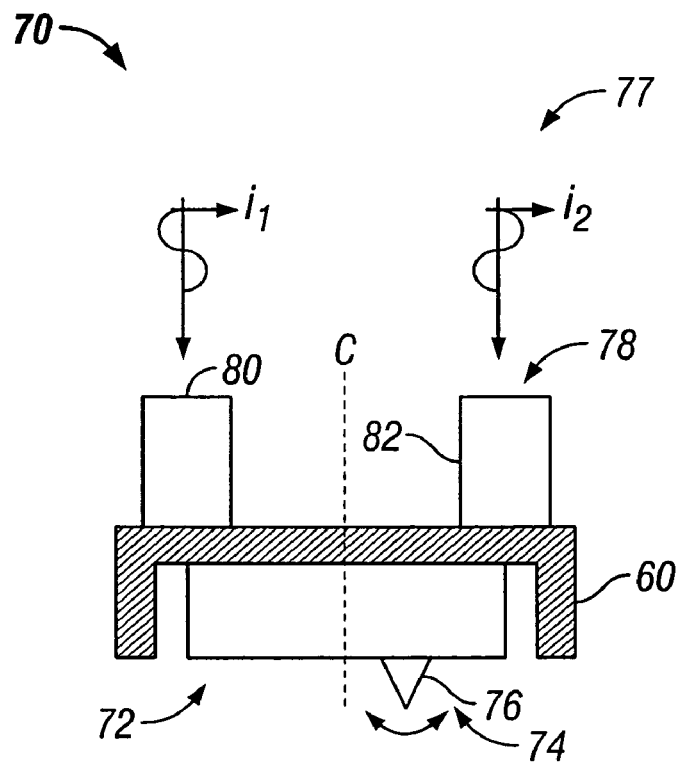
FIG. 4 is a view similar to FIG. 3, illustrating using two piezoelectric actuators to excite a torsional resonance of the probe.

Turning to FIG. 4, a probe assembly 70 for exciting a torsional resonance of a probe 74 of a probe chip 72 includes a drive 77 having an actuator 78, preferably defining a pair of piezoelectric elements 80, 82, such as piezo stack actuators mounted generally symmetrically about the center of the probe holder 60. Again, probe holder 60 includes a probe pocket 58 configured to receive probe chip 72. In this case, when driving actuators 80, 82 with signals $i_1$ and $i_2$ of generally equal amplitude but opposite phase, a tip 76 of probe 74 of probe chip 72 moves laterally as the system attempts to achieve oscillation of the probe 74 at a torsional resonance of the probe, as described in detail in the application expressly incorporated by reference herein. Note that the drive source(s) that produce $i_1$ and $i_2$ (not shown in FIG. 4), together with actuator 78, may hereinafter be referred to collectively as the drive 77.

One problem, however, is that the actuator 78 often times is not disposed symmetrically about probe 74, and particularly the tip 76, when probe chip 72 is mounted in probe holder 60. As described in detail in the Background, this causes non-ideal torsional oscillation of the probe.

More particularly, tip 76 of probe 74 often times does not lie on a line through the center of the entire probe chip 72 (marked with a dashed line labeled "C"), perpendicular to the backside of the cantilever of probe 74, as shown in FIG. 4, and thus this lack of alignment yields compromised lateral oscillation. Although the probe chip 72 typically can be mounted generally symmetrically relative to elements 80, 82, the tip 76 of probe 74 often does not lie at the center point between actuator elements 80, 82, which generally define the center of rotation of actuator 78 (including actuator pair 80 and 82), marked "C". As a result, energy provided by actuator 78 coupled to the off-center tip 76 will be unequal from either side if drive signals $i_1$ and $i_2$ have equal amplitudes and opposite phase. Therefore, pure torsional resonance will not predictably be achieved and the performance of the AFM in TR mode will be correspondingly compromised. In fact, pure torsional resonance typically will not be achieved unless the tip 76 of probe 74, by mere fortuitous chance, directly underlies the center of rotation of actuator 78. Again, this most often will not be the case due to the nonpredictability of the manufacturing and mounting processes.

Figure 5:
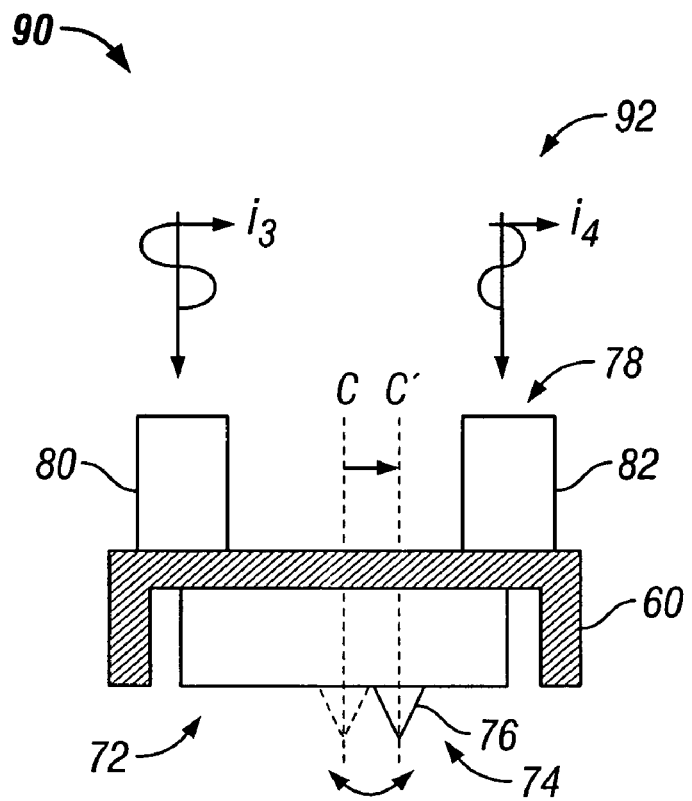
FIG. 5 is a front elevational view similar to FIGS. 3 and 4, illustrating balancing the output of the piezoelectric actuators to excite pure torsional resonance, according to the preferred embodiment.

To overcome this non-alignment problem between tip 76 and the center of rotation of actuator 78, a preferred modification to the assembly 70 shown in FIG. 4 has been made and is shown as assembly 90 in FIG. 5. Turning to FIG. 5, probe assembly 90 includes a drive 92 having a drive source (not shown) that applies drive signals $i_3$ and $i_4$ to actuator 78. Although similarly out of phase, $i_3$ and $i_4$ may be applied at different amplitudes, contrary to drive signals $i_1$ and $i_2$ that have equal amplitudes. In this case, the virtual rotation center created by piezo pair 80 and 82 is shifted from C to C', substantially directly overlaying the top of the cantilever probe rotation axis. Notably, such a shift will reduce flexural component of the drive acting upon the cantilever probe.

As shown in FIG. 5, drive signal $i_3$ is applied with a greater amplitude than $i_4$. As a result, the center or axis of rotation provided by actuator 78 is shifted from a line "C" about which the actuator elements 80, 82, are disposed symmetrically to a line marked "C'" that is substantially centered or aligned with the actual position of tip 76. Because, in this case, tip 76 is disposed right of the center line defined by actuator elements 80, 82, as mounted within probe holder 60, the amplitude of the signal applied to the right actuator element 82, namely $i_4$, is applied with a smaller amplitude than $i_3$.

It is notable that it is difficult to predict exactly where tip 76 lies relative to actuator 78. Therefore, the values of the amplitudes of $i_3$ and $i_4$ are selected, either manually or automatically, to achieve the greatest response amplitude. The output of this selecting operation is illustrated by "$A_1$" and "$A_2$" in FIG. 6.

More particularly, as the amplitudes of the drive signals $i_3$ and $i_4$ are modified, the amplitude of the response of probe 74 oscillating at its torsional resonance frequency is observed. This is shown, for example, in FIG. 6. By driving the probe with a balanced drive (i.e., response "$A_2$" in FIG. 6), efficient coupling of the drive energy to tip 76 for torsional oscillation is provided and the response is optimized at a torsional resonance frequency of probe 74 to achieve an optimum torsional response thereof.

In one preferred embodiment, this may be accomplished by trial and error as the amplitudes of the two signals are modified and the response of probe 74 is monitored by a user. As the $i_3$ and $i_4$ amplitudes are adjusted, the torsional amplitude can be made to shift from $A_1$ to $A_2$ (FIG. 6) at the resonance frequency. Preferably, this function is implemented with a balance control circuit, described in further detail below in connection with FIGS. 9 and 10, that controls the drive signal applied to each actuator element 80, 82. Again, effectively, the rotation center provided by actuator elements 80, 82, upon application of corresponding signals $i_3$ and $i_4$, causes the center of rotation provided by the elements, in the case shown in FIG. 5, to move to the right so that the center of rotation substantially directly overlies an axis along the length of the cantilever and through tip 76 of probe 74, in other words, so the axis of rotation provided by the drive is substantially aligned with the probe tip.

Figure 6:
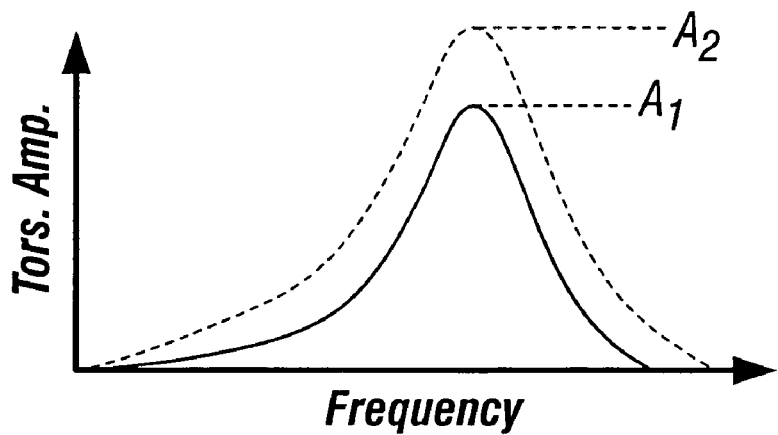
FIG. 6 is a graph showing torsional amplitude versus frequency, illustrating a peak response amplitude of the probe oscillating in torsion.
Figure 7:
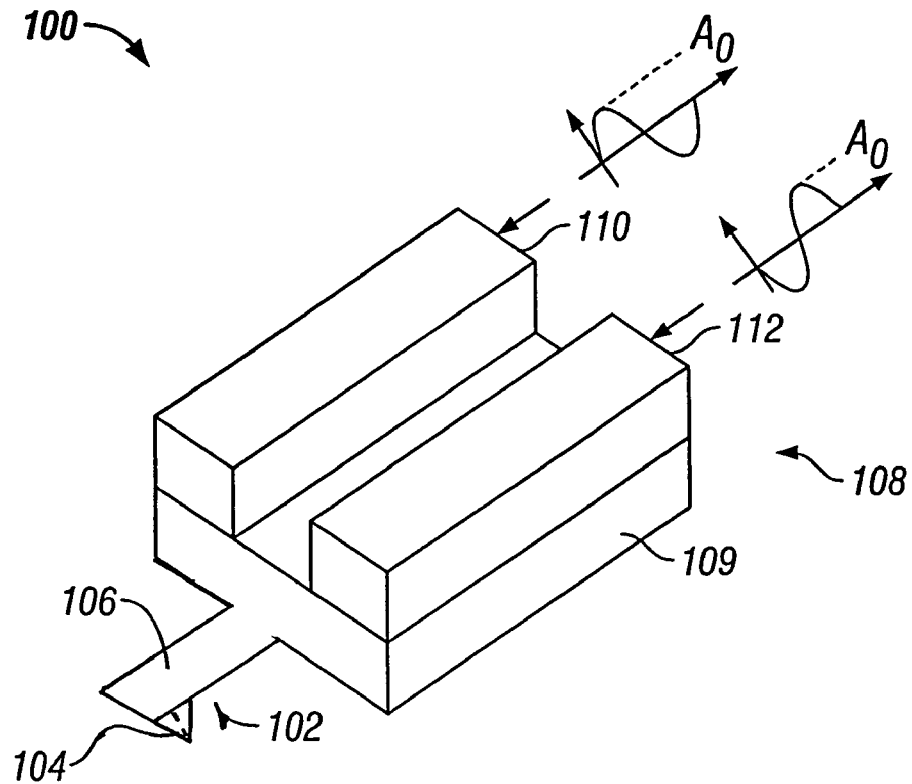
FIG. 7 is a perspective view of a probe assembly including two actuators for exciting torsional resonance where the actuators are disposed generally symmetrically about the central axis of the cantilever.
Figure 8:
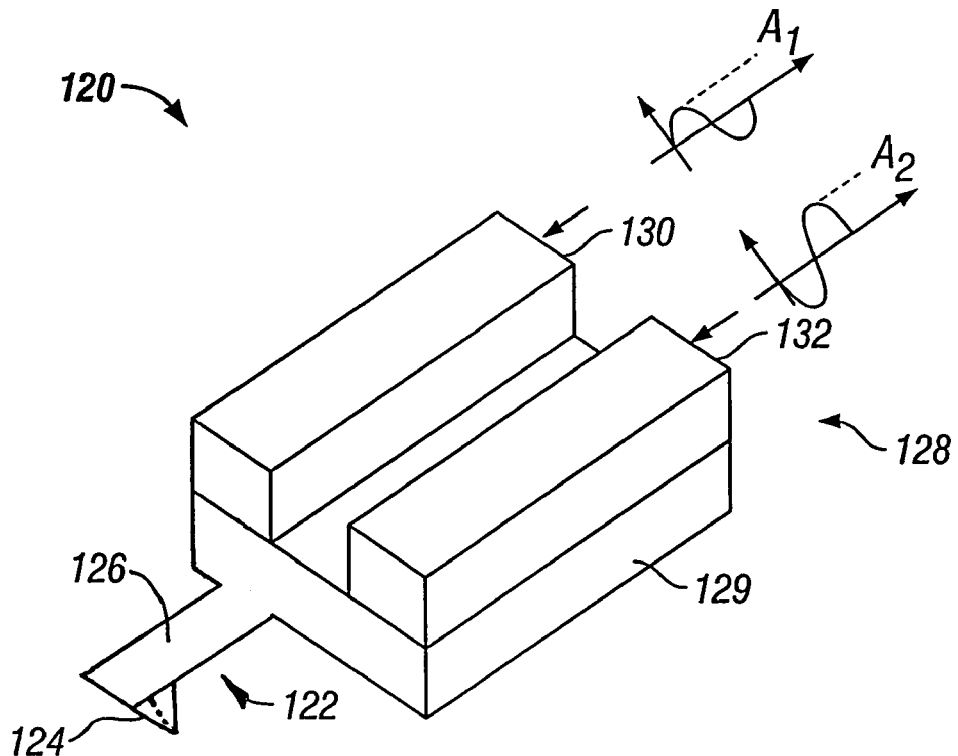
FIG. 8 is a perspective view similar to FIG. 7, with the rotation center of the actuators generally not overlying the center longitudinal axis of the cantilever of the probe, illustrating drive signals applied to the piezoelectric actuators having different amplitudes to balance the drive.

This operation is illustrated similarly in the out of scale perspective views of FIGS. 7 and 8. As shown in FIG. 7, a probe assembly or chip 100 includes a probe 102 defining a tip 104 supported by a cantilever 106. In this case, a driving mechanism 108 is supported by probe chip 100 itself, rather than a probe holder, as in the embodiments illustrated in FIGS. 3–5. When probe 102, and in particular tip 104 of probe 102, is disposed at a plane generally at the geometric center between a pair of actuator elements 110, 112 of driving mechanism 108, a pure torsional resonance may be achieved by applying signals having equal amplitudes, $A_0$, but opposite phase. However, for the probe assembly 120 shown in FIG. 8, where tip 124 of probe 122 is not situated at the rotational center of a driving mechanism 128, i.e., not equidistant from actuator elements 130, 132 of driving mechanism 128, exciting the actuators with signals having equal amplitude but opposite phase will not yield the optimum torsional resonance response. In fact, the torsional amplitude will be as generally shown with the solid line in FIG. 6.

To achieve optimum response at the torsional resonance frequency, input signals having the opposite phase and different amplitudes ($A_1$ and $A_2$) are applied to the actuator elements 130, 132. In this case, because probe 122 is situated closer to actuator element 130 than element 132, $A_2$ should be greater than $A_1$ upon balancing the drive 128, to move the rotational center thereof. Again, balancing the drive is accomplished by the user manually, via observation, or it can be implemented automatically using a control algorithm, as described in further detail below. Again, as discussed previously, by balancing the drive, the rotation center of actuator 128 is shifted from a position on a center plane between the two actuator elements 130, 132 to a position that is substantially contiguous with the center line of probe 122 through tip 124. As a result, pure torsional resonance is achieved, thus maximizing sensitivity and otherwise optimizing performance.

Figure 9:
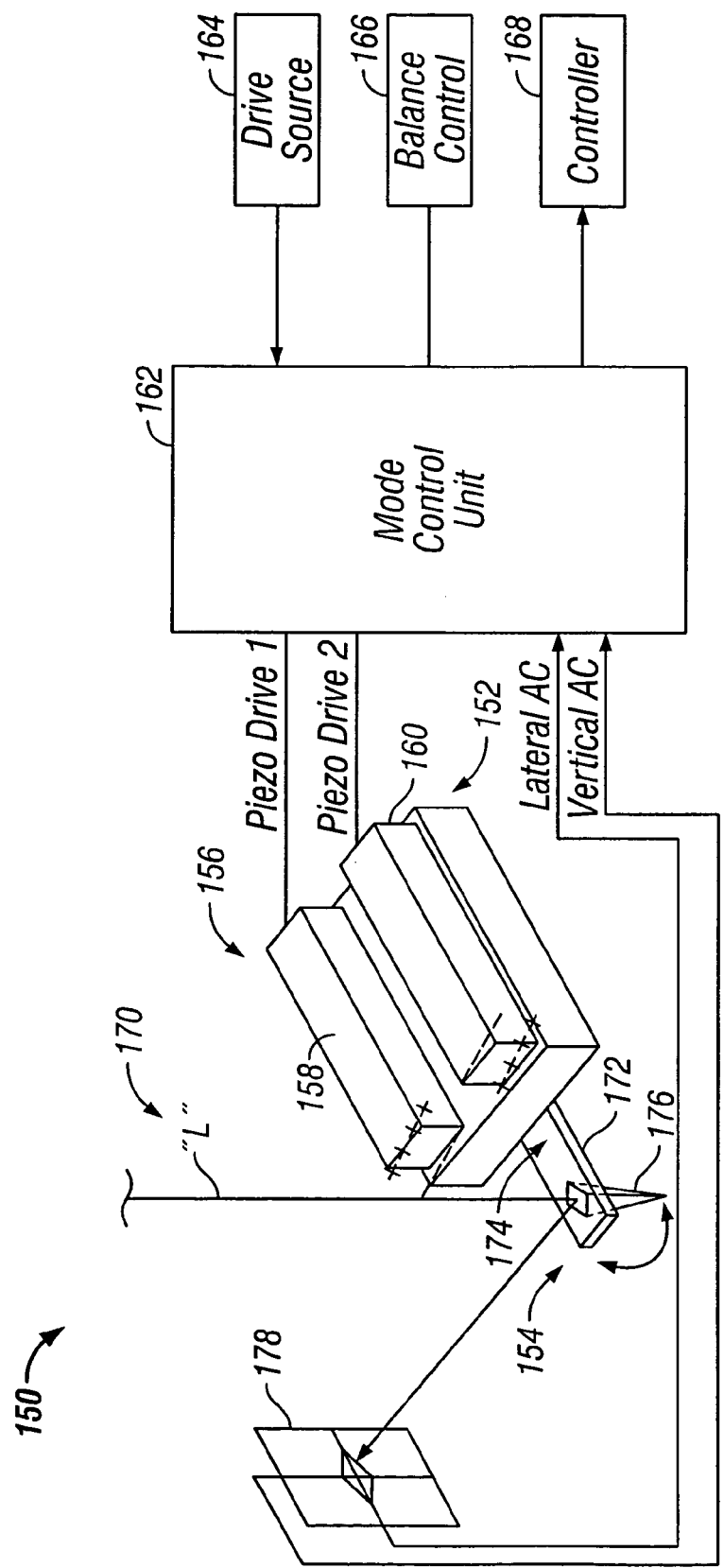
FIG. 9 is a schematic diagram illustrating an atomic force microscope employing a mode control unit to drive a probe into torsional oscillation, according to a preferred embodiment.

Turning next to FIG. 9, an AFM 150 operating in torsional resonance mode includes a circuit for maintaining optimum oscillation of the probe at a torsional resonance thereof. In particular, a probe assembly 152 including a probe 154 mounted to a probe holder (not shown) that supports a drive mechanism 156 including a pair of piezoelectric actuator elements 158, 160 is shown. To drive piezoelectric actuators 158, 160, a mode control unit 162 coupled to a piezoelectric drive source 164 (i.e., an oscillating voltage source) processes the drive signal to generate signals labeled "Piezo Drive 1" and "Piezo Drive 2" in FIG. 9, which feed to actuators 158, 160, respectively. A balance control block 166 is provided to control the output of mode control unit 162 so that drive signals having appropriate amplitudes, namely "Piezo Drive 1" and "Piezo Drive 2", excite pure lateral motion of the tip at a torsional resonance of the probe, as described in further detail below in connection with FIG. 10.

In operation, probe 154 is driven into oscillation while a detection system 170 monitors probe oscillation, including changes thereof. Detection system 170 includes a light source (not shown) that generates a laser beam "L", for instance, that is directed towards a back side 174 of a cantilever 172 of probe 154, such that the beam is reflected off cantilever 172 and towards a sensor 178. Preferably, sensor 178 is a quadrature photodetector that can monitor both lateral changes and flexural changes in the oscillation of probe 154, as is well known in atomic force microscopy. Signals from sensor 178 are then transmitted to the mode control unit 162 whereby changes in the reflected lateral AC signal and the reflected vertical AC signal can be discriminated. More particularly, depending upon the mode of operation, either flexural mode or torsional mode, the lateral AC signal or the vertical AC signal is monitored to detect changes from the set-point characteristic of oscillation (for example, amplitude or phase) in response to interaction between a tip 176 of probe 154 and the sample (not shown). Using a feedback controller 168, the set-point can be maintained based on the mode of operation in conventional fashion. These changes can then be plotted to map sample characteristic(s) under test.

Figure 10:
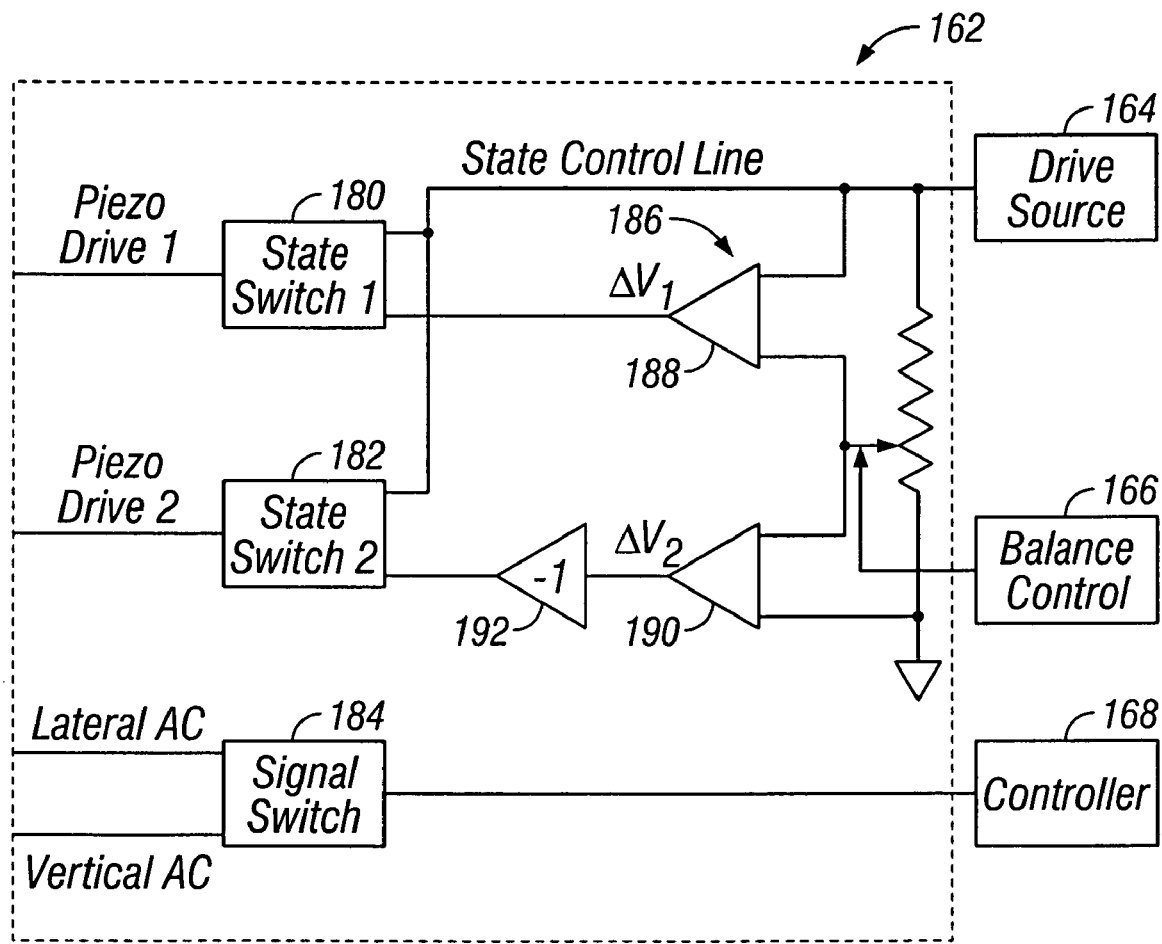
FIG. 10 is a schematic diagram of the mode control unit of FIG. 9.

Again, critical to optimum operation is balancing the drive to achieve pure torsional resonance of probe 154. In this regard, mode control unit 112 is employed to appropriately drive probe 154 at torsional resonance when in torsional resonance mode, and drive probe 154 into flexural resonance in vertical oscillating mode. Turning to FIG. 10, mode control unit 162 is shown in full detail. Mode control unit 162 includes three switches including two state switches 180, 182 and a signal switch 184. State switches 180, 182 operate together with signal switch 184 to coordinate the excitation signals applied to piezoelectric actuator elements 158, 160, as well as discriminate which signals (either torsional or flexural) acquired by the detection system 170 (FIG. 9) should be further processed.

More particularly, in flexural mode, state switches 180, 182 operate to transmit the signal applied to their top inputs, which in each case is the output of the piezo drive source 164 directly, with no further signal processing. As a result, the same signal, including phase and amplitude, is applied to the piezoelectric actuators of the drive so that the flexural resonance of the probe 154 (FIG. 9) can be excited. In this mode, signal switch 184 is set so that it passes the vertical AC signal obtained from sensor 178 (FIG. 9) to controller 168. Controller 168 is preferably a standard SPM controller that receives the signal indicative of oscillation of probe 154 (in either torsional or flexural mode) and operates using feedback to maintain the set-point oscillation, as noted above.

When the state switches 180, 182 are set for torsional mode operation, the signals applied to the piezoelectric actuator elements can be modified. A voltage multiplier (e.g., a voltage divider 186) is provided to modify (in this case split) the voltage applied by piezo drive 164 to mode control unit 162 according to the setting of balance control unit 166. More particularly, in this case, the divided voltage is applied to operational amplifiers 188, 190 (i.e., differential amplifiers, FIG. 10) which generate a $\Delta V_1$ and a $\Delta V_2$ that are used to drive the piezoelectric actuators. Moreover, an inverter 192 is included to condition the $\Delta V_2$ signal 180 degrees so that $\Delta V_1$ and $\Delta V_2$ are opposite in phase. In sum, with state switches 180, 182 set for torsional resonance mode operation, signals having appropriate amplitudes and being 180 degrees out of phase are applied to the piezoelectric actuators to excite pure torsional resonance oscillation of tip 176 of probe 154 (FIG. 9).

Importantly, balance control unit 166 may be a manually operated knob (operable similarly as a left-right balance control knob of an audio amplifier), or it may be implemented with appropriate electronics in feedback to automatically set the balance control, and thus the applied signals "Piezo Drive 1" and "Piezo Drive 2," to achieve the maximum output amplitude, as illustrated in FIG. 6. When manually selecting the amplitude of the signals to balance the drive, the operator observes, in real-time, the response of the probe's oscillation. Once the rotation center of the two actuators is aligned with the tip of the probe, a maximum amplitude response of the torsional oscillation of the probe will occur and can be observed by the user at which time the balance control is set.

Alternatively, this balancing is done automatically using appropriate circuitry and control software. Specifically, an algorithm can be employed to evaluate the response of the probe (i.e., lateral AC input (e.g., amplitude) to mode control unit 162) and, based on the response, appropriately adjust the balance control unit 166 so that "Piezo Drive 1" and "Piezo Drive 2" cause the probe to oscillate with a maximum amplitude at torsional resonance. Notably, in torsional resonance mode, signal switch 184 may be set so that the lateral AC signal acquired by the sensor is transmitted from mode control unit 162 to controller 168 to maintain probe oscillation at the set-point.

Figure 11:
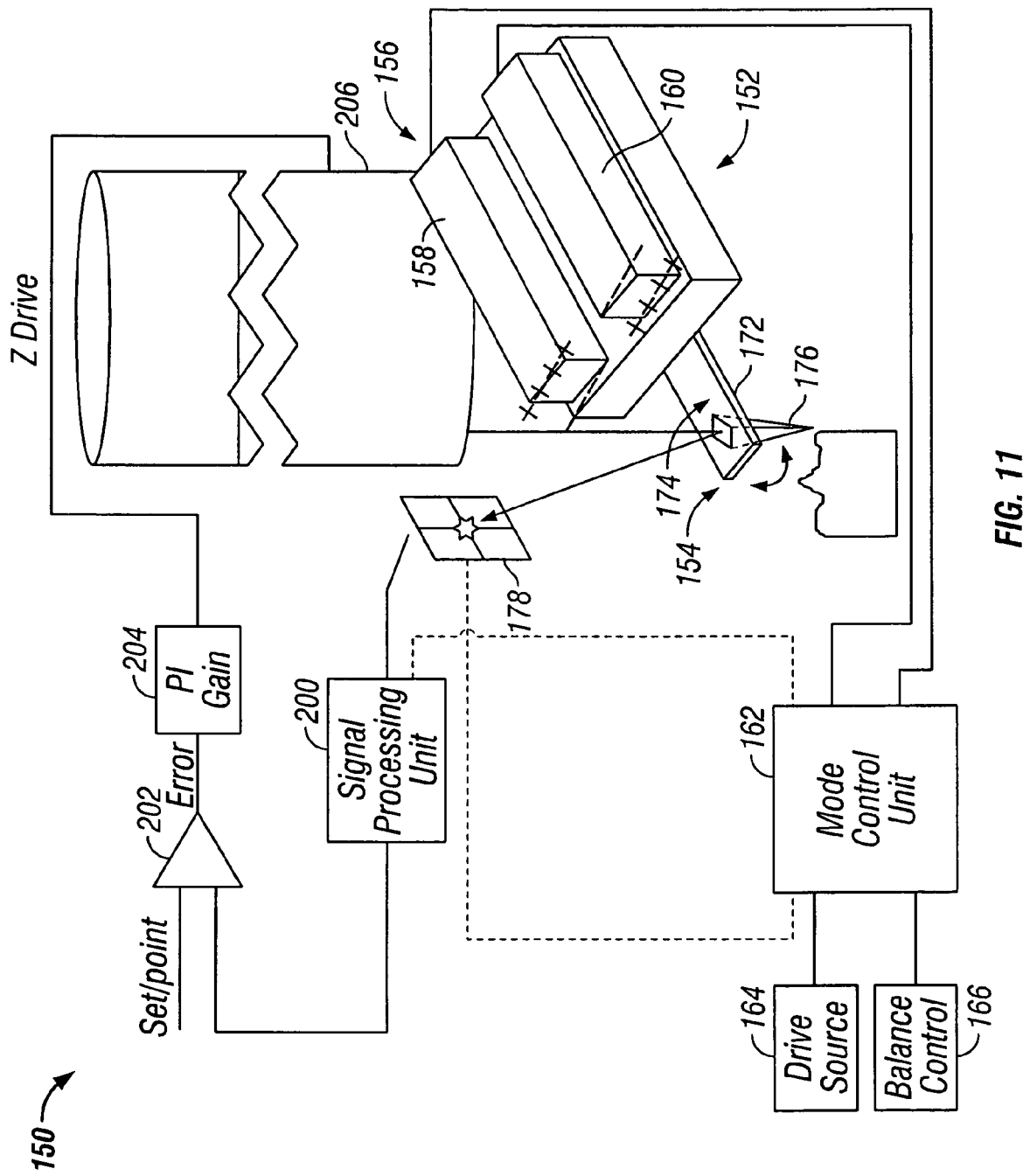
FIG. 11 is a schematic diagram of an atomic force microscope according to a preferred embodiment, including a probe assembly, the mode control unit, and a feedback loop.

Next, turning to FIG. 11, operation of AFM 150 is shown in further detail. Generally, mode control unit 162 is used to maintain oscillation of tip 162 of probe 154 at its torsional resonance while a feedback loop is employed to control tip-sample separation by maintaining a characteristic of the oscillation of probe 154 at a set-point. The set-point may be either a flexural mode set-point or a torsional resonance mode set-point. In operation, sensor 178 receives the laser beam reflected from backside 174 of cantilever 172 of probe 154 and transmits, for example, a lateral deflection signal to a signal processing unit 200 for ultimate comparison to the TR Mode set-point. In particular, signal processing unit 200 receives an output signal from sensor 178 and conditions that signal so that it may be compared to the set-point. Signal processing unit 200 may be an RMS-to-DC converter that generates a lateral RMS signal that is transmitted to, for instance, a comparator 202. An error signal based on a comparison of the set-point with the lateral RMS signal is generated and transmitted to a control block 204 (e.g., a PI controller) of the feedback loop. Controller 204 applies an appropriate gain to the error signal to generate a control signal (labeled "Z Drive") that may be used to control the Z position drive actuator 206 (for example, the Z section of a piezoelectric XYZ scanner) to control tip-sample separation. In this case, actuator 206 translates probe assembly 152 coupled thereto so that the selected characteristic of probe oscillation returns to the TR mode set-point.

Alternatively, the system may be operated in flexural mode. In this case, rather than a lateral deflection signal transmitted to signal processing unit 200 by the quadrature photodetector 178, a probe deflection (flexural) signal is transmitted to signal processing unit 200. Notably, in this regard, optional signal switch 184 of mode control unit 162 shown in FIG. 10 is not activated, as shown with the dashed lines in FIG. 11.

Figure 12:
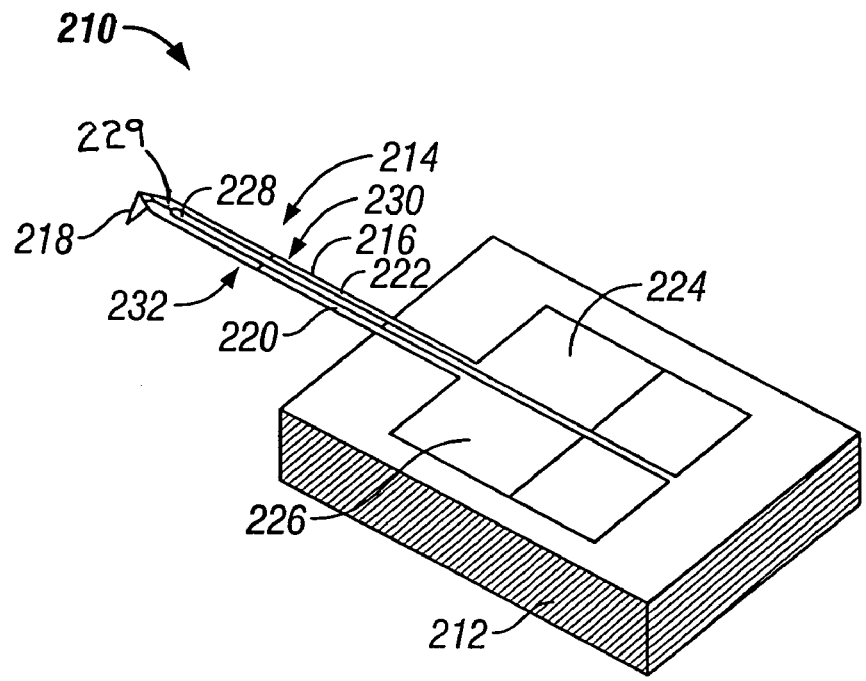
FIG. 12 is a perspective view of a probe usable in flexural and torsional modes, illustrating integrated actuator elements.

Turning next to FIG. 12, a probe assembly 210 according to an alternate preferred embodiment of achieving optimum torsional oscillation implementing an active lever such as that shown and described, e.g., in co-owned U.S. Pat. Nos. 6,189,374 and 6,530,266 is illustrated. Probe assembly 210 is similar to the above-described probe assembly/chip in that two actuator elements are used to drive the tip into torsional resonance, but the actuator elements are integrated with the probe to generate this torsional motion. Because the actuation layer is fabricated with the cantilever in a batch process, the torsional rotation axis of the actuator pair substantially overlaps the rotation axis of the cantilever composite. Actuation could be a pure torque, providing the cleanest way of driving torsional oscillation mode. More particularly, probe chip 210 includes a base 212 and a probe 214. Probe 214 defines a cantilever 216 extending from base 212, the cantilever supporting a tip 218 and which may be oscillated in both flexural mode and in torsional resonance mode.

A pair of actuator elements 220, 222 are preferably formed with the probe and comprise a piezoelectric material such as zinc oxide. Base 212 and cantilever 216 of probe chip define a top surface upon which the first and second zinc oxide actuator elements 220, 222 are disposed generally symmetrically about a longitudinal plane passing through tip 218 of probe 214, perpendicular to the top surface of cantilever 216. On top of each of the zinc oxide actuator elements 220, 222 is disposed a respective electrode 224, 226 via which the piezo drive signals are applied to the elements. In this arrangement, the energy coupled to tip 218 of probe 214 does not need to propagate through additional structure (such as probe holder 60 in FIG. 5 or base 109 in FIG. 7) as it does in the above-described embodiments, and thus the energy is coupled to tip 218 more efficiently, enhancing this probe's ability to achieve oscillation at pure torsional resonance.

Notably, in this embodiment, a central portion 228 of cantilever 216 of probe 214 can be machined so that the probe defines two separate parallel arms 230, 232 joining together again at the point 229. The zinc oxide actuator elements 220, 222 and corresponding electrodes 224, 226 are disposed upon the two separate arms 230, 232, thus reducing the lateral stiffness of cantilever 216. Torsional stiffness thus approaches the flexural stiffness of the probe which can permit more predictable excitation of torsional oscillation. In addition, when using the mode control unit 162 (FIGS. 9–11), tip motion can be efficiently controlled such that flexural response and torsional response can be completely separated by resonance frequency range.

Figure 13:
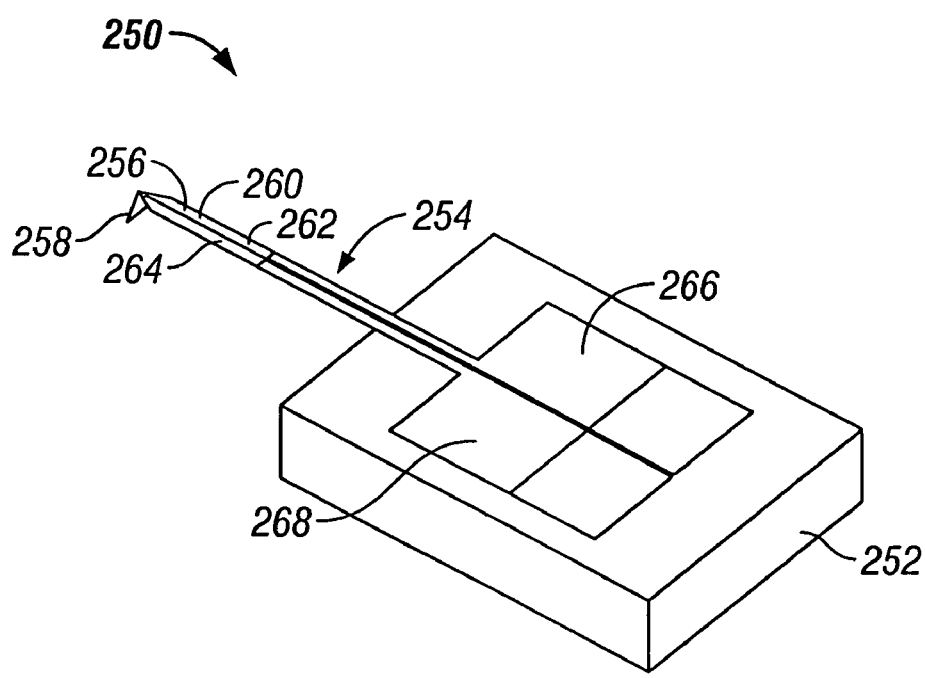
FIG. 13 is perspective view of a probe including integrated actuator elements similar to FIG. 12, according to an alternate preferred embodiment.

Turning to FIG. 13, an alternative embodiment of using an active lever with split actuators usable in torsional resonance mode is shown. A probe assembly 250 includes a base 252 and a probe 254 defining a cantilever 256 extending from base 252. Cantilever 256 supports a tip 258 and has a backside 260 supporting integrated actuator elements 262, 264, preferably zinc oxide elements. A pair of respective electrodes 266, 268 is disposed on actuator elements 262, 264 to allow actuators 262, 264 to receive appropriate drive signals. Functionally, the FIG. 13 probe chip 250 is generally identical to the assembly 210 shown in FIG. 12, however it is easier to fabricate. This is primarily due to the fact that two parallel cantilever arms are not formed by machining the cantilever through a central axis thereof. Notwithstanding ease of fabrication, however, the torsional stiffness of probe chip 230 is higher than probe chip 210 shown in FIG. 12, and coupling between torsional motion and flexural motion may occur, particularly in the subresonance frequency region. Such coupling is unacceptable and must be monitored and accounted for, for example, by proper control of tip oscillation at resonance.

Figure 14:
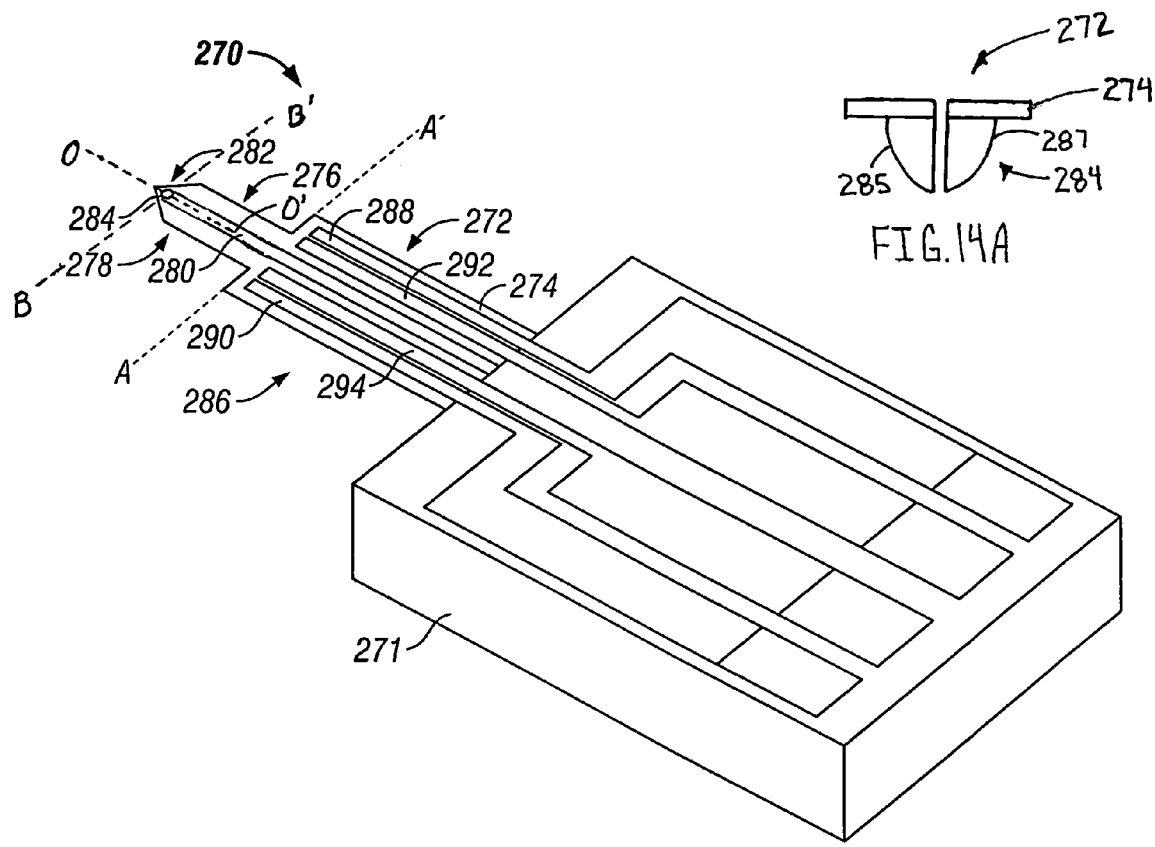
FIG. 14 is a perspective view of a probe with a split cantilever similar to that shown in FIG. 12, illustrating two pairs of electrodes for exciting both flexural and torsional oscillation.

In FIG. 14, another alternate design of a probe chip 270 is shown. In this case, a cantilever 274 of a probe 272 is split into two branches 276, 278 that are capable of rotating independently, as with probe 214 shown in FIG. 12. Similar to probe 214, probe 272 has an opening 280 along a length or central axis of cantilever 274, for example, machined therein, to define arms 276, 278. Arms 276, 278 are fixed to a base 271 of assembly 270 on one end, while the opposite ends of arms 276, 278 are coupled at a distal end 282 of probe 272 to support a tip 284. Moreover, the width of branches 276, 278 at region 286 of cantilever 274 in this case is slightly larger than in the split cantilever probe chip 210 shown in FIG. 12 near base 271 to accommodate two electrodes 288, 290, 292, 294 on each branch and allow flexural oscillation of tip generally about axis A–A'. Line O–O' represents a fine cut 280 through the cantilever probe 272, preferably using a focused ion beam, thus creating a cross-section profile at B–B' as seen in FIG. 14A. As the two arms 272 and 286 rotate in opposite directions, the apex portion of probe tip 284 will open and close, serving as a nanotweezer with generally two to three orders of magnitude larger force than a typical electrostatic force. In this embodiment, one pair of the electrodes 288, 290, for instance, on the two branches of cantilever 274 is used to excite flexural oscillation of tip 284, while the opposite pair of electrodes 292, 294 are used to selectively rotate tip portions 285, 287. Notably, if flexural mode is desired, the tip portions 285, 287 are rotated into engagement with one another.

Figure 15:
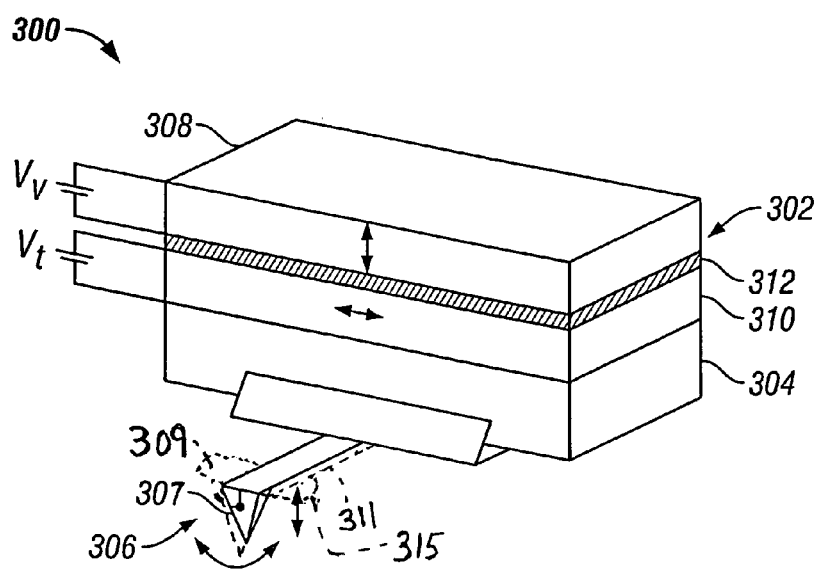
FIG. 15 is a perspective view illustrating an alternate arrangement for exciting torsional resonance of a probe, including a piezoelectric actuator for flexurally oscillating the probe.

An alternate preferred method of exciting torsional resonance of a probe in an SPM application is shown in FIG. 15. More particularly, a probe assembly 300 including a driving mechanism 302 coupled to a base 304 of probe assembly 300 is operable at both a flexural and a torsional resonance of a corresponding probe 306. A vertical actuator 308 driven by a voltage $V_v$ is preferably coupled to a shear mode actuator 310 (e.g., a piezo stack) driven by a voltage $V_T$ such that either a flexural resonance or a torsional resonance of probe 306 can be excited, via inertial force of the tip for torsional resonance and inertial force of the cantilever for flexural resonance. In this example, shear mode piezo 310 provides lateral movement that is coupled to probe 306 and ultimately a tip 307 of probe 306 to oscillate the tip in torsion. The user separately controls $V_v$ and $V_T$ to excite either vertical resonance or torsional resonance as preferred. Optionally, an insulated spacer 312 may be provided between the vertical piezo and the shear mode piezo to isolate and optimize coupling of the corresponding energy to the probe tip 307.

Notably, unlike the previously described embodiments, balance control is not needed to optimally drive probe tip 307 at torsional resonance. This is due to the fact that shear piezo actuator 310 is employed to directly facilitate lateral motion of tip 307, i.e., the problem associated with the center of rotation of the driving mechanism does not exist. Overall, by mounting piezoelectric elements 308, 310 on a base 304 of probe assembly 300 as shown, an image of a sample in flexural mode can be generated while nearly immediately being able to image the same scan line of the sample in torsional resonance mode with appropriate control of $V_v$ and $V_T$.

Figure 16:
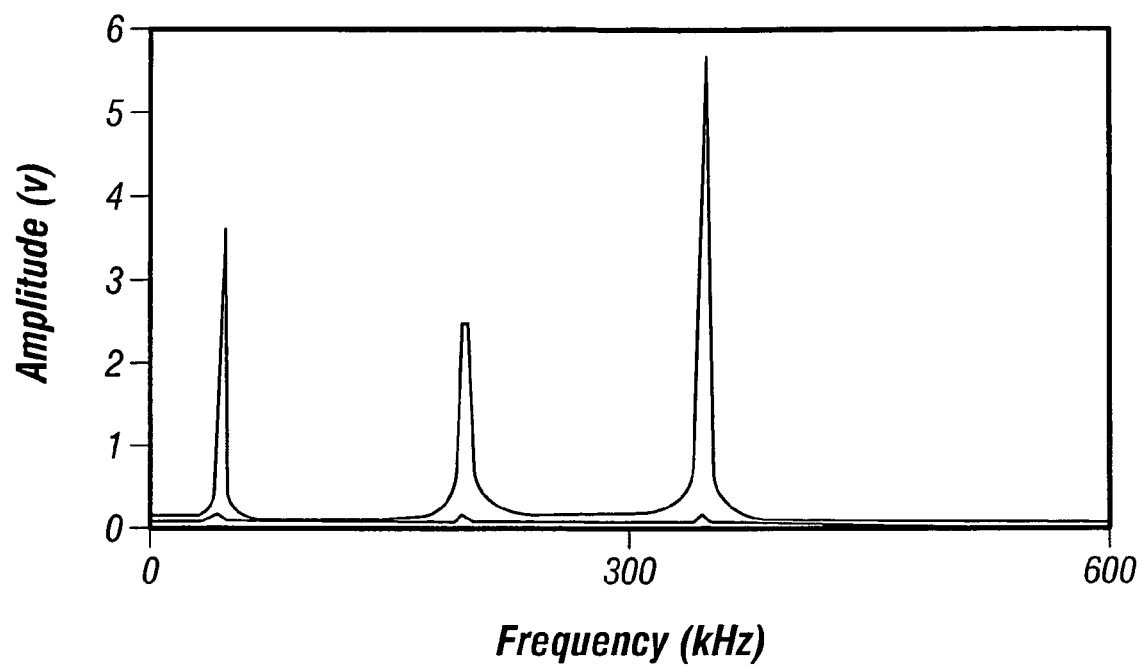
FIG. 16 is a schematic graph illustrating amplitude versus frequency, illustrating the response of the probe in flexural mode including using the probe shown in FIG. 13 and the control system shown in FIG. 9.
Figure 17:
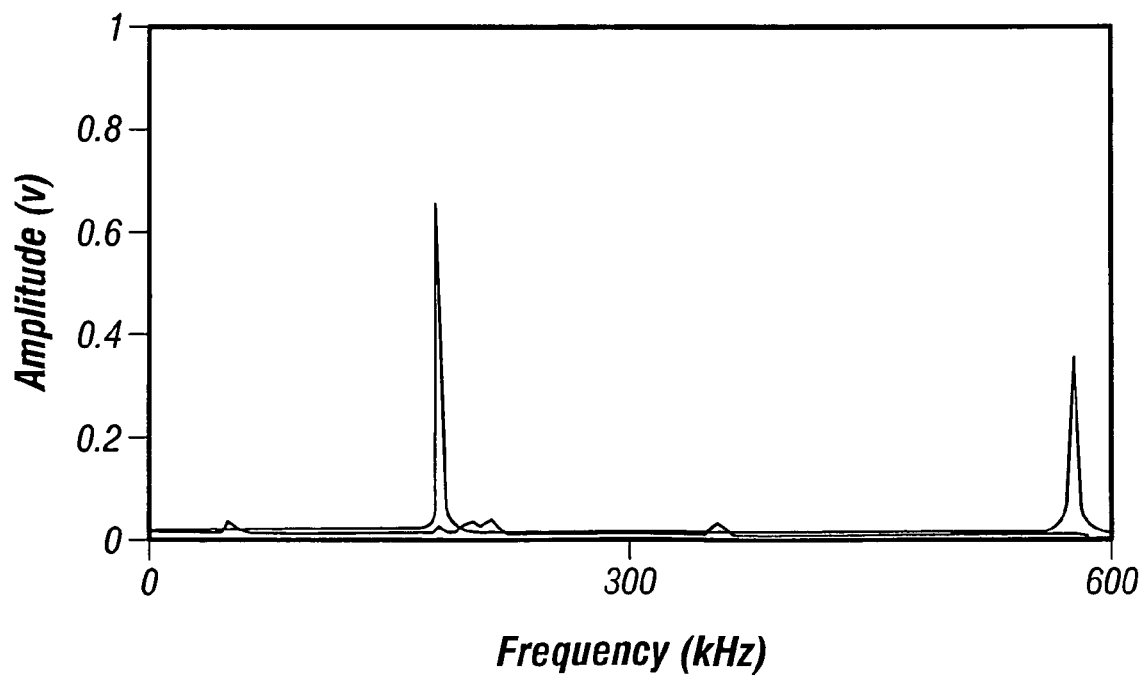
FIG. 17 is a schematic graph similar to FIG. 16, illustrating the response of the probe in torsional or lateral mode.

An illustration of the response of probe 230 shown in FIG. 13 as operated in AFM system 150 in FIG. 11 is illustrated in FIGS. 16 and 17. More particularly, in FIG. 16, once switched to operate in flexural mode, the vertical signal output from the quadrature photodetector (for example, 178 in FIG. 11) shows peaks at resonance (about 50, 200 and 366 KHz). At the peaks of the plotted signal in flexural mode, the corresponding lateral signal is shown with an ideally small amplitude, as desired. Once switched to torsional resonance mode, with the lateral drive, the lateral AC signal detected shows peaks at a resonance frequency of about 175 kHz and at an overtone at about 590 kHz, as shown in FIG. 17. Similar to flexural mode, the vertical signal at the frequencies associated with the peaks of the torsional response is correspondingly small, as desired.

Figure 1:
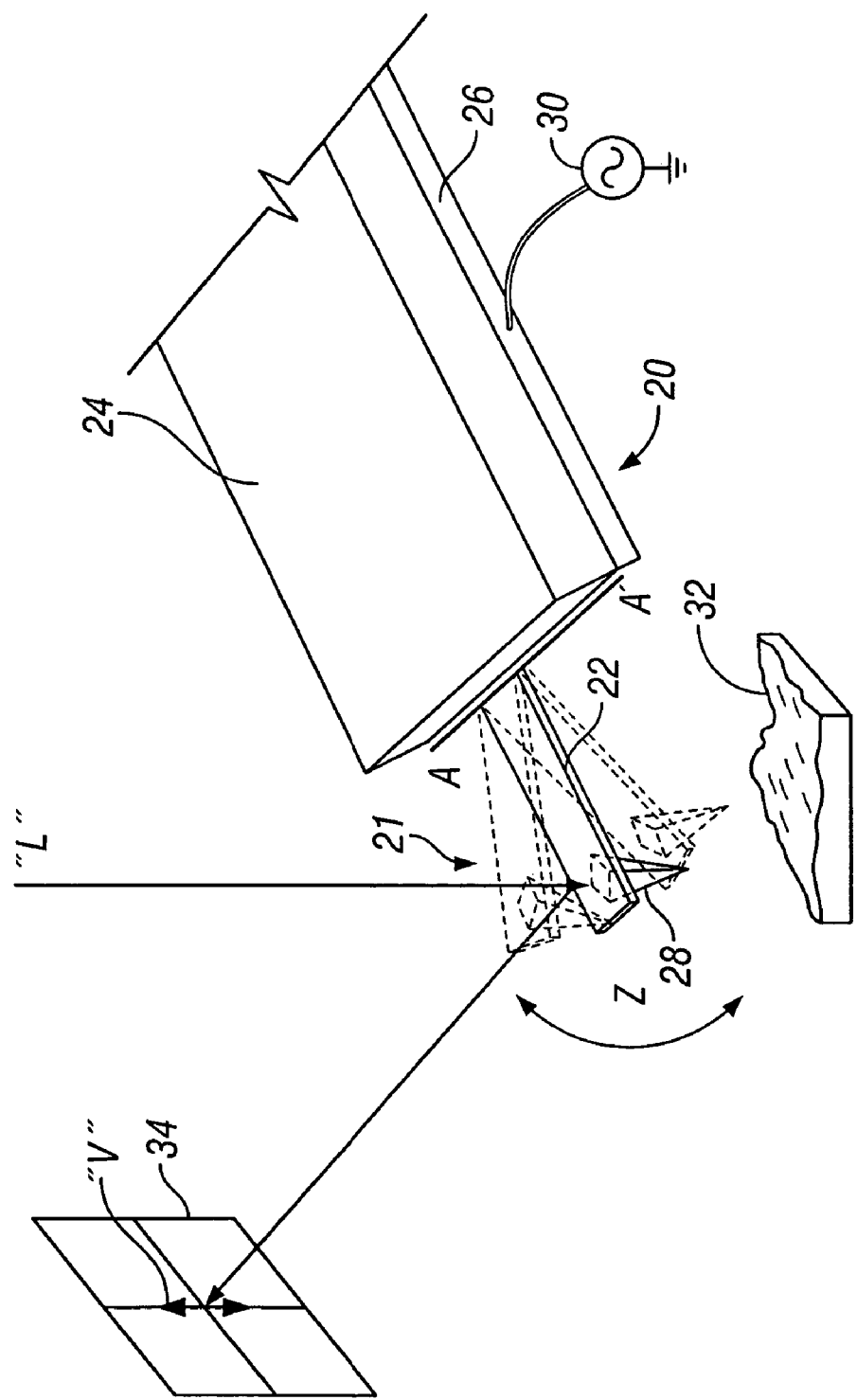
FIG. 1 is a schematic view of a prior art scanning probe microscope configured for flexural mode operation, appropriately labeled "Prior Art"
Figure 2:
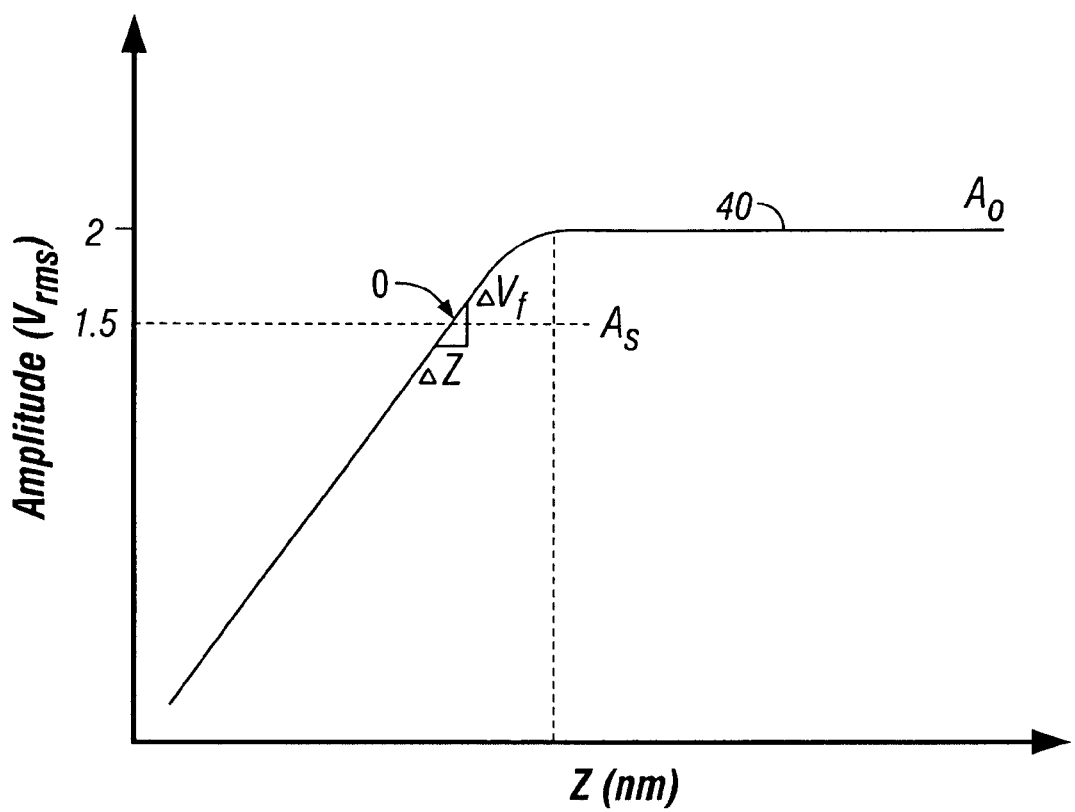
FIG. 2 is a curve illustrating the response of the flexural mode AFM shown in FIG. 1, appropriately labeled "Prior Art"

Referring back to FIGS. 2 and 2A, an illustration of the response 42 achieved by an AFM operating in torsional resonance (TR) mode according to the present preferred embodiments, as well as the flexural mode response (FIG. 2), is shown. In FIG. 2, the amplitude response of an AFM operating in conventional flexural oscillation mode to a change in tip-sample separation, $\Delta Z$, is a illustrated as a change in the detected voltage signal, $\Delta V_f$. Notably, the corresponding slope, $\Delta V_f/\Delta Z$, is indicative of the response and defines data acquisition speed and accuracy. The larger the slope, the more sensitive the AFM is to small changes in tip-sample interaction, and the faster the AFM image can be obtained. This is due in part to minimizing electrical noise, given the inherent physics associated with oscillating the lever in torsion. In addition, the feedback controller (e.g., a PI loop) is responsive to the magnitude of the feedback error signal generated during operation. Because much smaller changes in tip-sample separation create much larger changes in the amplitude response (error signal is larger), data may be acquired significantly faster when the AFM operating in TR mode according to the preferred embodiments.

Figure 2A:
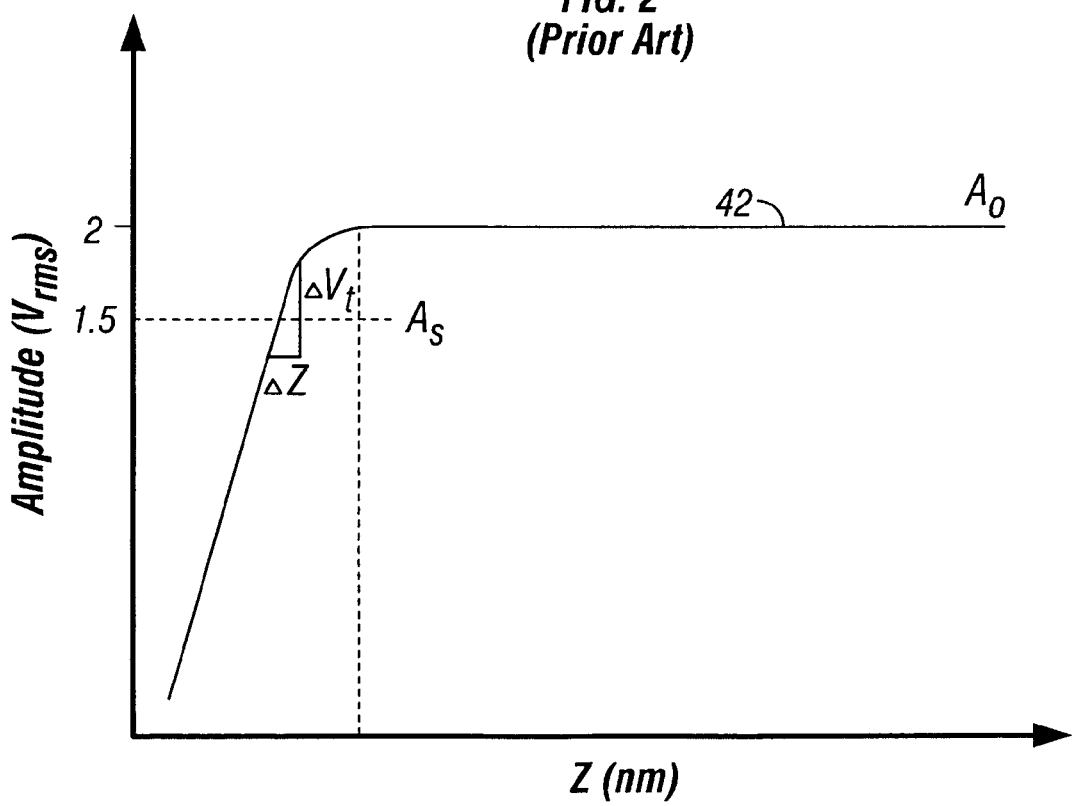
FIG. 2A is a curve illustrating the response of a torsional resonance mode AFM, as shown for example in FIG. 9.

In this regard, and in contrast to FIG. 2, FIG. 2A illustrates the response of the AFM when operating the AFM in TR mode. The difference in the response to tip-sample interaction is dramatic. For the same change in tip-sample separation, $\Delta Z$, a much larger change in the detected voltage signal, $\Delta V_r$, is observed. Because $\Delta V_r/\Delta Z$ is much larger than the slope associated with flexural mode, $\Delta V_f/\Delta Z$, a significant improvement in imaging sensitivity and data acquisition speed is realized. As a result, more accurate images (i.e., small changes in tip-sample interaction are readily detected) can be obtained at greater speeds.

One aspect of driving the probe into torsion in addition to that described above is fabricating the probe to improve the inertial effects of the probe itself on the corresponding oscillation. In particular, the construction of the probe may be intentionally modified to improve the efficiency of achieving torsional oscillation. In this regard, the probe may be made asymmetric along a longitudinal centerline of the probe, thus facilitating oscillation at, for example, a torsional resonance of the lever. This is accomplished using a microfabrication process to place the tip off the centerline of the probe, a process that is relatively easy to control. Alternatively, or in addition, the tip height may be made greater than the tip height of conventional probes, thus facilitating excitation of the probe to produce torsional motion thereof.

For examplary purposes only, we refer to FIG. 15, showing each of these features in phantom. In particular, a tip 309 having a larger tip height than the nominal tip height of conventional tip 307 is shown optionally in phantom. Notably, a conventional tip 307 has a nominal tip height of about 10–15 µm. Preferably, this larger tip height is greater than 15 µm, and more preferably about 20 µm. FIG. 15 also shows a cantilever 311 of the probe in phantom in which tip 307 (or 309) is offset from the centerline of the cantilever 311, thus providing the asymmetry and inertial benefits previously mentioned.

A similar characteristic of the probe that may be modified to facilitate exciting torsional oscillation is fabricating the cantilever itself so that its shape adds to the inertial force responsible for creating the torsional motion. More particularly, by making the cantilever asymmetrical, for example, by placing a paddle-shaped portion having an asymmetric shape near its end (see 315 in phantom in FIG. 15), the difference in mass on either side of the centerline of the cantilever takes advantage of inertial forces to facilitate efficiently oscillating the cantilever in torsion. All in all, rather than the previous embodiments that specifically align the axis of rotation of the drive with the tip, torsional oscillation with each of these probe construction characteristics can be effectively enhanced and/or excited using a conventional drive.

Although the best mode contemplated by the inventors of carrying out the present invention is disclosed above, practice of the present invention is not limited thereto. For example, the sample may be subjected to alternate environments (e.g., varied media, atmospheric conditions, etc.), and the corresponding torsional mode response analyzed. Notably, such alterations may change oscillation properties of the probe as desired by the user. Moreover, a voltage phase control unit may be used in addition to the mode control unit to modify the phase of the two drive signals in the preferred embodiment, to selectively operate the AFM in torsional and flexural modes. It will be manifest that various additions, modifications and rearrangements of the features of the present invention may be made without deviating from the spirit and scope of the underlying inventive concept.

What is claimed is:

1. A method of operating a scanning probe microscope, the method comprising:
    using a probe having a cantilever defining a longitudinal axis;
    oscillating the probe in torsion using an actuator; and
    wherein said oscillating step is performed so as to substantially align an axis of rotation of said actuator with the longitudinal axis.

2. The method of claim 1, wherein said actuator includes first and second actuators disposed relative to the probe so as to generate torsional motion of a tip of the probe.

3. The method of claim 2, wherein the first and second actuators are piezoelectric actuators.

4. The method of claim 2, wherein the actuators are disposed generally symmetrically relative to the tip.

5. The method of claim 3, wherein the first and second actuators are driven by corresponding first and second drive signals, the first and second drive signals being about 180° out of phase.

6. The method of claim 5, wherein said oscillating step includes modifying at least one of the amplitudes of the first and second drive signals to achieve the substantial alignment.

7. The method of claim 6, wherein said modifying step includes using a mode control unit to adjust the amplitudes of the first and second drive signals so that the axis of rotation substantially directly overlies an apex of the tip.

8. The method of claim 7, wherein said mode control unit includes a voltage multiplier.

9. The method of claim 7, wherein said mode control unit includes a voltage phase control unit wherein about a zero degree phase difference between the drive signals excites flexural motion of the cantilever and about a 180° phase difference between the drive signals excites torsional motion of the cantilever.

10. The method of claim 7, wherein said mode control unit operates automatically to substantially align the axis of rotation with the tip so as to substantially maximize a torsional response of the probe at a given drive amplitude.

11. The method of claim 1, wherein the probe is an active probe having at least one active element.

12. The method of the claim 11, wherein the active element is a composite piezoclectric layer disposed on the cantilever with at least one corresponding electrode integrated with the probe.

13. The method of claim 11, wherein the at least one electrode includes first and second electrodes adapted to receive corresponding first and second drive signals.

14. The method of claim 12, wherein the first and second drive signals are about 180° out of phase.

15. The method of claim 11, wherein the active element is driven by at least one of a group of physical forces including a thermal stress and an electromagnetic force.

16. The method of claim 11, wherein the cantilever includes first and second substantially longitudinal portions, wherein at least a section of said longitudinal portions is separated by a gap.

17. The method of claim 16, wherein at least one of the first and second substantially longitudinal portions deform torsionally in response to at least one of the first and second drive signals.

18. The method of claim 16, wherein a tip at a distal end of the cantilever includes first and second tip portions corresponding to the first and second substantially longitudinal portions.

19. The method of claim 18, wherein the first and second tip portions are actuatable so as to form a nanotweezers.

20. The method of claim 18, wherein the first and second longitudinal portions each include corresponding pairs of electrodes, a first pair for receiving appropriate signals to selectively excite torsional motion of the cantilever, and a second pair for receiving appropriate signals to selectively excite flexural motion of the cantilever.

21. The method of claim 1, further comprising the step of detecting a change in torsional oscillation of the probe.

22. The method of claim 21, further comprising providing a vertical piezoelectric actuator to selectively oscillate the probe in flexural mode.

23. The method of claim 22, wherein said actuator is a shear piezoelectric actuator, and wherein the vertical and shear actuators are coupled.

24. The method of claim 23, wherein a spacer is disposed intermediate the vertical and shear piezoelectric actuators.

25. A method of operating a scanning probe microscope in torsional resonance mode, the method comprising the steps of:
oscillating a tip of a probe with an actuator at about a torsional resonance frequency of the probe; and
wherein said oscillating step includes substantially aligning an axis of rotation of the actuator with an apex of the tip.

26. The method of claim 25, wherein the actuator includes first and second actuator elements disposed substantially symmetrically about the probe and wherein said aligning step includes balancing an output of the actuator elements.

27. The method of claim 26, and said balancing step includes applying first and second drive signals to the first and second actuators, and modifying the first and second drive signals so as to achieve the alignment.

28. The method of claim 27, wherein said applying step includes selecting the amplitudes of the first and second drive signals.

29. The method of claim 28, wherein the first and second drive signals have opposite phase.

30. The method of claim 29, wherein said selecting step is performed automatically.

31. The method of claim 25, wherein the actuator is integral with the probe.

32. A scanning probe microscope comprising:
a probe having a tip;
a drive to oscillate said probe in torsion;
wherein said drive has an axis of rotation that substantially directly overlies an apex of said tip.

33. The scanning probe microscope of claim 32, wherein said drive includes at least one drive source and an actuator.

34. The scanning probe microscope of claim 33, wherein said actuator includes first and second actuator elements, and wherein the drive source applies corresponding first and second drive signals to the actuator elements.

35. The scanning probe microscope of claim 34, further comprising a mode control unit to modify the first and second drive signals to balance the drive so that the axis of rotation substantially directly overlies the apex of the tip.

36. The scanning probe microscope of claim 35, wherein the mode control unit includes a voltage multiplier.

37. The scanning probe microscope of claim 33, wherein said actuator is disposed on said probe.

38. The scanning probe microscope of claim 35, wherein said mode control unit balances the drive automatically.

39. The scanning probe microscope of claim 34, wherein said drive is controlled to selectively oscillate said probe at about a flexural resonance of said probe.

40. The scanning probe microscope of claim 32, wherein torsional resonance feedback is used to maintain a set-point of probe oscillation.

41. The scanning probe microscope of claim 32, wherein said drive oscillates said probe at a torsional resonance of said probe.

* * * * *